(12) United States Patent
Theyab

(10) Patent No.: US 11,415,717 B2
(45) Date of Patent: Aug. 16, 2022

(54) EDGE-PRESERVING GAUSSIAN GRID SMOOTHING OF NOISE COMPONENTS IN SUBSURFACE GRIDS TO GENERATE GEOLOGICAL MAPS

(71) Applicant: Saudi Arabian Oil Company, Dhahran (SA)

(72) Inventor: Abdullah A. Theyab, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/996,639

(22) Filed: Aug. 18, 2020

(65) Prior Publication Data
US 2022/0057539 A1    Feb. 24, 2022

(51) Int. Cl.
*G01V 1/34* (2006.01)
*G01V 1/18* (2006.01)

(52) U.S. Cl.
CPC .............. *G01V 1/345* (2013.01); *G01V 1/181* (2013.01); *G01V 2210/324* (2013.01); *G01V 2210/642* (2013.01)

(58) Field of Classification Search
CPC .. G01V 1/345; G01V 1/181; G01V 2210/642; G01V 2210/324; G01V 2210/63; G01V 2210/64; G01V 1/302; G01V 99/005
See application file for complete search history.

(56) References Cited

U.S. PATENT DOCUMENTS

| | | |
|---|---|---|
| 5,347,452 A | 9/1994 | Bay, Jr. |
| 5,771,318 A | 6/1998 | Fang et al. |
| 6,473,697 B2 | 10/2002 | Bouts et al. |
| (Continued) | | |

FOREIGN PATENT DOCUMENTS

| | | |
|---|---|---|
| CN | 107367759 | 11/2017 |
| CN | 110596751 | 12/2019 |
| JP | 5647187 | 12/2012 |

OTHER PUBLICATIONS

Google Search Results, Jun. 9, 2021, 1 pp. (Year: 2021).*
(Continued)

*Primary Examiner* — Toan M Le
(74) *Attorney, Agent, or Firm* — Fish & Richardson P.C.

(57) ABSTRACT

Methods and systems, including computer programs encoded on a computer storage medium can be used to preserve edges while performing Gaussian grid smoothing of noise components in subsurface grids to generate geological maps. A subsurface grid is generated from data indicating properties of subsurface formations. A weighting grid is generated by: i) receiving seismic data representing the subsurface formations; ii) generating seismic attributes associated with discontinuities in the subsurface formations; and iii) assigning a particular weight value to weighting grid points that the seismic attributes associated with discontinuities in the subsurface formations indicate the presence of a discontinuity. The subsurface grid is processed by iteratively computing local averages of grid points in the subsurface grid using a compact Gaussian filter weighted by values in the weighting grid. A geological map of subsurface formations is generated based on the filtered subsurface grid.

20 Claims, 8 Drawing Sheets
(2 of 8 Drawing Sheet(s) Filed in Color)

(56) References Cited

U.S. PATENT DOCUMENTS

| | | | |
|---|---|---|---|
| 8,170,288 B2 | 5/2012 | Wang et al. | |
| 10,067,255 B2 | 9/2018 | Colombo et al. | |
| 10,139,508 B1 | 11/2018 | Lemus et al. | |
| 10,139,510 B2 | 11/2018 | Morton et al. | |
| 10,625,859 B2 | 4/2020 | Beckman | |
| 2002/0035443 A1* | 3/2002 | Matteucci | G06T 7/64 702/155 |
| 2003/0179907 A1 | 9/2003 | Bouts et al. | |
| 2004/0225592 A1 | 11/2004 | Churquina | |
| 2011/0096626 A1 | 4/2011 | Zhu et al. | |
| 2014/0288842 A1 | 9/2014 | Maraschini | |
| 2017/0227664 A1 | 8/2017 | Dossary et al. | |

OTHER PUBLICATIONS

One Petro Search Results, Jun. 10, 2021, 10 pp. (Year: 2021).*

Le Calvez et al., Combining Surface and Downhole Microseismic Monitoring: A Multi-Well Completion in Oman, Nov. 9-12, 2015, Abu Dhabi International Petroleum Exhibition and Conference, Abu Dhabi, UAE, 24 pp. (Year: 2015).*

Baerg, "Traveltime in media with linear velocity-depth functions" CREWES Research Reports, 1991, 461-466, 6 pages.

Colombo et al., "Fully automated near-surface analysis by surface-consistent refraction method." Geophysics 81.4, 2016 ,U39-U49, 11 pages.

Colombo et al., "pQC: A novel approach for robust automatic near-surface analysis in low-relief geology." The Leading Edge 35.11, 2016, 952-960, 9 pages.

Hart, "Improving the reliability of first-break picking with neural networks." SEG Technical Program Expanded Abstracts 1996. Society of Exploration Geophysicists, 1996, 1662-1665, 4 pages.

Keho et al., "Revisiting automatic first arrival picking for large 3D land surveys." SEG Technical Program Expanded Abstracts 2009, Society of Exploration Geophysicists, 2009, 3198-3202, 5 pages.

Luo et al. (2002), "Edge-preserving Smoothing and applications." The Leading Edge, vol. 21, Iss. 2., 136-141, 158, 5 pages.

R. N. Bracewell, 1986, The Fourier Transform and its Applications, McGraw Hill, 7 pages.

Sabbione, et al., "Automatic first-breaks picking: New strategies and algorithms." Geophysics 75.4, 2010, V67-V76, 10 pages.

Fehmers et al., "Fast structural interpretation with structure-oriented filtering." Geophysics 68.4, Jul. 2003, 1286-1293, 8 pages.

Lavialle et al., "Seismic fault preserving diffusion." Journal of Applied Geophysics 61.2, Feb. 2007, 132-141, 10 pages.

Wu et al., "Detecting faults and channels while enhancing seismic structural and stratigraphic features." Interpretation 7.1, Feb. 2019, T155-T166, 12 pages.

PCT International Search Report and Written Opinion in International Appln. No. PCT/US2021/046542, dated Nov. 18, 2021, 19 pages.

* cited by examiner

EDGE-PRESERVING GAUSSIAN GRID SMOOTHING OF NOISE COMPONENTS IN SUBSURFACE GRIDS TO GENERATE GEOLOGICAL MAPS

TECHNICAL FIELD

This specification relates to geophysical and geologic prospecting, and more particularly, to generating geological maps of subsurface formations.

BACKGROUND

Having accurate maps is important for oil and gas exploration activities, such as quantifying the hydrocarbon resources in the subsurface, developing exploration and production strategies, and ultimately making drilling decisions. Subsurface maps are often comprised of one or more numerical grids (i.e., two-dimensional (2D) arrays) that are produced from interpreting subsurface data. Subsurface grids are often computed by interpreting seismic data, along with borehole data, remote measurement data such as gravity, and electromagnetic fields. Seismic data can also come from one or more seismic three-dimensional (3D) volumes and from 2D seismic data.

In reflection seismology, geologists and geophysicists perform seismic surveys to map and interpret sedimentary facies and other geologic features for applications such as identification of potential petroleum reservoirs. Seismic surveys are conducted by using a controlled seismic source (for example, a seismic vibrator or dynamite) to create a seismic wave. In land-based seismic surveys, the seismic source is typically located at ground surface. The seismic wave travels into the ground, is reflected by subsurface formations, and returns to the surface where it is recorded by sensors called geophones. Other approaches to gathering data about the subsurface (for example, well logging) can be used to complement the seismic data.

Subsurface data analysis and interpretation result in 2D grids that represent subsurface properties such as depth, thicknesses, depositional facies distribution, subsurface porosity, shale percentage, percentage of dolomite, etc. Such grids have a noise component that requires some filtering to generate geologically plausible maps of the subsurface. The noise components result from reasons that include, but not limited to, band-limitedness of seismic data, signal interference, computational artifacts, and dealing with different vintages of seismic data.

SUMMARY

The technology described in this specification provides a mapping technique that reduces the time spent interpreting faults and improves the accuracy of the subsurface maps by utilizing the seismic attributes. This approach uses data smoothing to reduce noise in grids representing subsurface properties while avoiding smoothing out subsurface boundaries, such as faults and stratigraphic terminations. This approach preserves geological boundaries during the filtering process to produce geologically plausible maps by providing the boundaries as input to filtering algorithms. This approach controls what edges are preserved based directly on the seismic attributes, typically guided by a human interpreter. The approach uses iterative local averaging with a spatially varying weight function.

The improved edge-preservation in a subsurface grid representing a property of the subsurface formation is based on a structural attribute of the subsurface formation. The property being smoothed is strictly spatial (e.g., two-dimensional) and it may be extracted form seismic data, derived from seismic data (e.g., estimated average porosities and formation thicknesses), or a property computed/recorded another source than seismic data (e.g., a property interpolated from borehole data such as reservoir net-to-gross porosity ratio). The structural attribute can be used to generate a weighting grid to aid a computational process used to smooth a noise profile of an input grid representing a spatial property of the subsurface formation. The spatially varying weight function can be generated by combining several seismic edge-detection attributes. The weight grid has the same geometry as the input grid. For example, techniques are described for implementation of an attribute-assisted smoothing algorithm that is adapted to receive a structural attribute computed and edited by an interpreter of a data mapping engine.

When a noisy subsurface grid is generated from data indicating properties of a subsurface formation, the mapping engine receives the noisy subsurface grid as an input for processing using the interpreter and the smoothing algorithm. The interpreter passes a weighting grid that represents a structural attribute of the subsurface formation as an input to the smoothing algorithm. The weighting grid is configured to have the same geometry as the noisy subsurface grid and includes numerical weight values that are equal to, or closer to, zero. Weight values that are equal to (or close to) zero indicate edges or grid points of the noisy subsurface grid that are to be preserved when the smoothing algorithm is used to filter out the noise components of the subsurface grid.

The noisy subsurface grid is processed to generate a filtered subsurface grid using a filter that is weighted by values in the weighting grid. A geological map of subsurface formations is generated based on the filtered subsurface grid.

One aspect of the subject matter described in this specification can be embodied in a method of generating geological maps of subsurface formations by implementing edge-preservation and filtering of noise components in subsurface grids. The method includes generating a subsurface grid from data indicating properties of the subsurface formations; and generating a weighting grid by: i) receiving seismic data representing the subsurface formations; ii) generating seismic attributes associated with discontinuities in the subsurface formations; and iii) assigning a reduced weight to weighting grid points that the seismic attributes associated with discontinuities in the subsurface formations indicate the presence of a discontinuity.

The method includes processing the subsurface grid by iteratively computing local averages of grid points in the subsurface grid using a compact Gaussian filter weighted by values in the weighting grid; generating a filtered subsurface grid in response to processing the subsurface grid by iteratively computing the local averages of grid points in the subsurface grid; and generating a geological map of subsurface formations based on the filtered subsurface grid.

These and other implementations can each optionally include one or more of the following features. For example, in some implementations, iteratively computing local averages of grid points in the subsurface grid using the compact Gaussian filter includes: decomposing the compact Gaussian filter into multiple individual filters; and applying each of the multiple individual filters consecutively to grid points in the subsurface grid that correspond to a discontinuity. In some implementations, iteratively computing local averages of grid points in the subsurface grid includes: computing each iteration of a local average using a spatially varying weight function.

In some implementations, generating the weighting grid includes: varying the weight function based on spatial coordinates of a set of grid points in the subsurface grid; and generating the weighting grid in response to varying the weight function. In some other implementations, generating a weighting grid includes: generating a weighting grid that indicates each edge or discontinuity of the subsurface grid to be preserved when filtering multiple noise components in the subsurface grid.

Applying each of the multiple individual filters consecutively to grid points in the subsurface grid can include: generating a respective output grid for each application of an individual filter of the multiple individual filters. The compact Gaussian filter can be decomposed into four individual filters that are applied consecutively to grid points in the subsurface grid or to grid points of an output grid that corresponds to at least one of the four individual filters.

In some implementations, the method includes: providing grid points of the respective output grid generated from a first application of a first individual filter as inputs to a second application of a second individual filter. In some other implementations, generating the filtered subsurface grid includes: generating the filtered subsurface grid based at least on a respective output grid that is generated from the second application of the second individual filter.

The subject matter described in this specification can be implemented to realize one or more of the following advantages. An improved methodology is described for generating geological maps of subsurface formations from a subsurface grid in response to smoothing or filtering out noise components of the grid, while concurrently preserving discontinuities such as edges, faults, or facies change. In contrast to prior filtering options, the described technology allows for attribute-assisted smoothing that does not require statistical approaches based on unjustified assumptions about the nature of the geophysical data and noise elements in a subsurface grid.

This approach also avoids the need to model or interpret edges (e.g., faults or other geological boundaries) as surfaces, polygons, or polylines, which is the basis of the approaches and methods used by some commercial mapping software to perform grid smoothing. The modeling of subsurface faults to polygons and polylines can be time consuming and imprecise, especially if there are complex fault systems present in the subject area.

The described technology provide the advantage of an edge-preserving filtering approach that can eliminate, or substantially reduce, noise in a subsurface grid while using seismic attributes to preserve the geological discontinuities. The technology also leverages compact Gaussian filters to generate weight values that indicate edges of discontinuities to be preserved when filtering noise components from the subsurface grid. Use of the weight values provides an improved method of controlling which edges are preserved when a smoothing (filtering) algorithm is used to process the subsurface grid.

In contrast to approaches that filter the input seismic data before the interpretation of seismic data begins, the approach described in this specification results directly into a grid. This avoids the artifacts, such as bandwidth limitedness and seismic multiples interference, which would result in noisy grids even if the input 3D seismic volume is smoothed. In addition, this approach avoids the noise that could come into a grid after incorporating input data other than the seismic reflectivity such as velocity volumes, and near-surface statics solutions. In addition, this approach can be used to smooth grids from non-seismic sources such as well-based statistical estimates for subsurface reservoir properties.

The details of one or more embodiments of these systems and methods are set forth in the accompanying drawings and the following description. Other features, objects, and advantages of these systems and methods will be apparent from the description and drawings, and from the claims.

BRIEF DESCRIPTION OF THE DRAWINGS

The patent or application file contains at least one color drawing executed in color. Copies of this patent application publication with one or more color drawings will be provided by the Patent and Trademark Office upon request and payment of the necessary fee.

Like reference numbers and designations in the various drawings indicate like elements.

DETAILED DESCRIPTION

Accurate geological maps of subsurface formations can be important tools for use in oil and gas exploration. For example, the geological maps are used for estimating hydrocarbon resources in a subsurface area such as a reservoir. The information provided by the geological maps are used to make decisions about drilling locations, including allocation and expenditure of resources for hydrocarbon exploration. The geological maps are often comprised of one or more numerical grids that are produced from geological and geophysical data. For example, the numerical grids correspond to subsurface grids generated using geophysical data such as well formation tops and seismic data.

The data used to produce the grids contain noise and error components, which causes the numerical subsurface grids to be inherently noisy. Because seismically derived subsurface grids have noise components, the grids require filtering to generate a geologically plausible maps of a subsurface area. In addition to the noise components, the subsurface grids also include discontinuities that provide useful information for estimating hydrocarbon resources. In the presence of discontinuities, such as faults and facies change, prior filtering approaches would cause undesired smoothing or filtering out of such discontinuities, making the maps invalid or ineffective for use during drilling operations.

This specification describes systems and techniques that can be used to filter a subsurface grid to reduce or eliminate the noise effect, while preserving discontinuities such as edges or faults that are indicators of oil and gas resources for hydrocarbon exploration. The techniques can be implemented using a data mapping engine that receives and processes data values corresponding to a noisy subsurface grid. The subsurface grid is processed to generate a filtered subsurface grid using a filter that is weighted by values in a weighting grid. The weighting grid is generated using a compact Gaussian filter that assigns certain numerical weighting values to grid points of the weighting grid to distinguishing edges from more heavily weighted noise components of a subsurface grid. A geological map of subsurface formations is generated based on the filtered subsurface grid.

Figure 1:
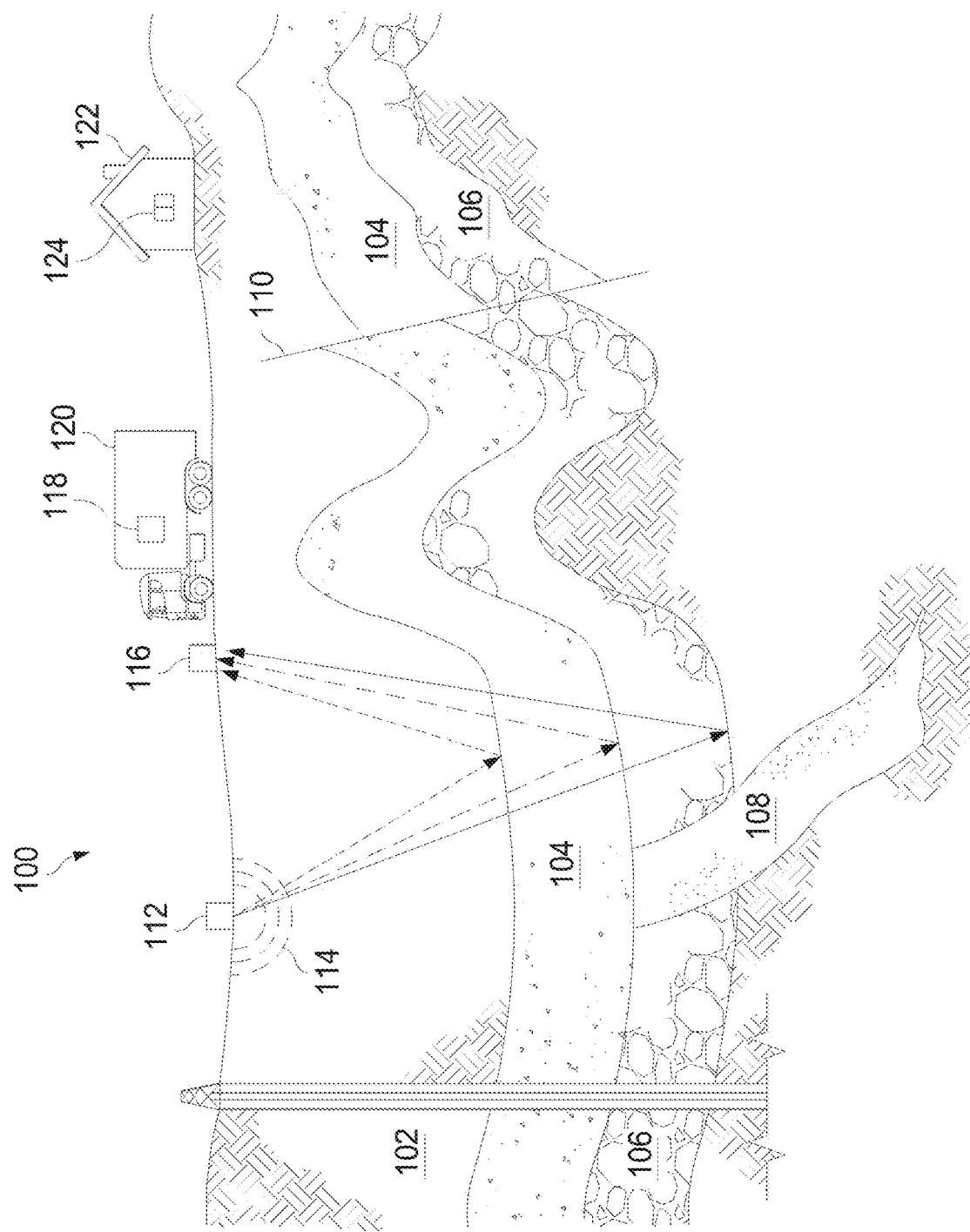
FIG. 1 is a schematic view of a seismic survey being performed to map subsurface features such as facies and faults.

FIG. 1 is a schematic view of a seismic survey being performed to map subterranean features such as facies and faults in a subterranean formation 100. Seismic data gathered by such seismic surveys is used implement the grid smoothing approach described in this application.

The subterranean formation 100 includes a layer of impermeable cap rocks 102 at the surface. Facies underlying the impermeable cap rocks 102 include layers 104, 106, 108. A fault line 110 extends across the layer 104 and the layer 106.

A seismic source 112 (for example, a seismic vibrator or an explosion) generates seismic waves 114 that propagate in the earth. The velocity of these seismic waves depends on properties that include density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the layer 104, the layer 106, and the layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, such as a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location other than the control center 122. Some computer systems are provided with functionality for manipulating and analyzing the data, such as performing seismic interpretation or borehole resistivity image log interpretation, to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also display results of the analysis of the seismic data associated with the seismic survey. The results of the survey can be used to generate a geological model representing properties or characteristics of the subterranean formation 100.

Figure 2:
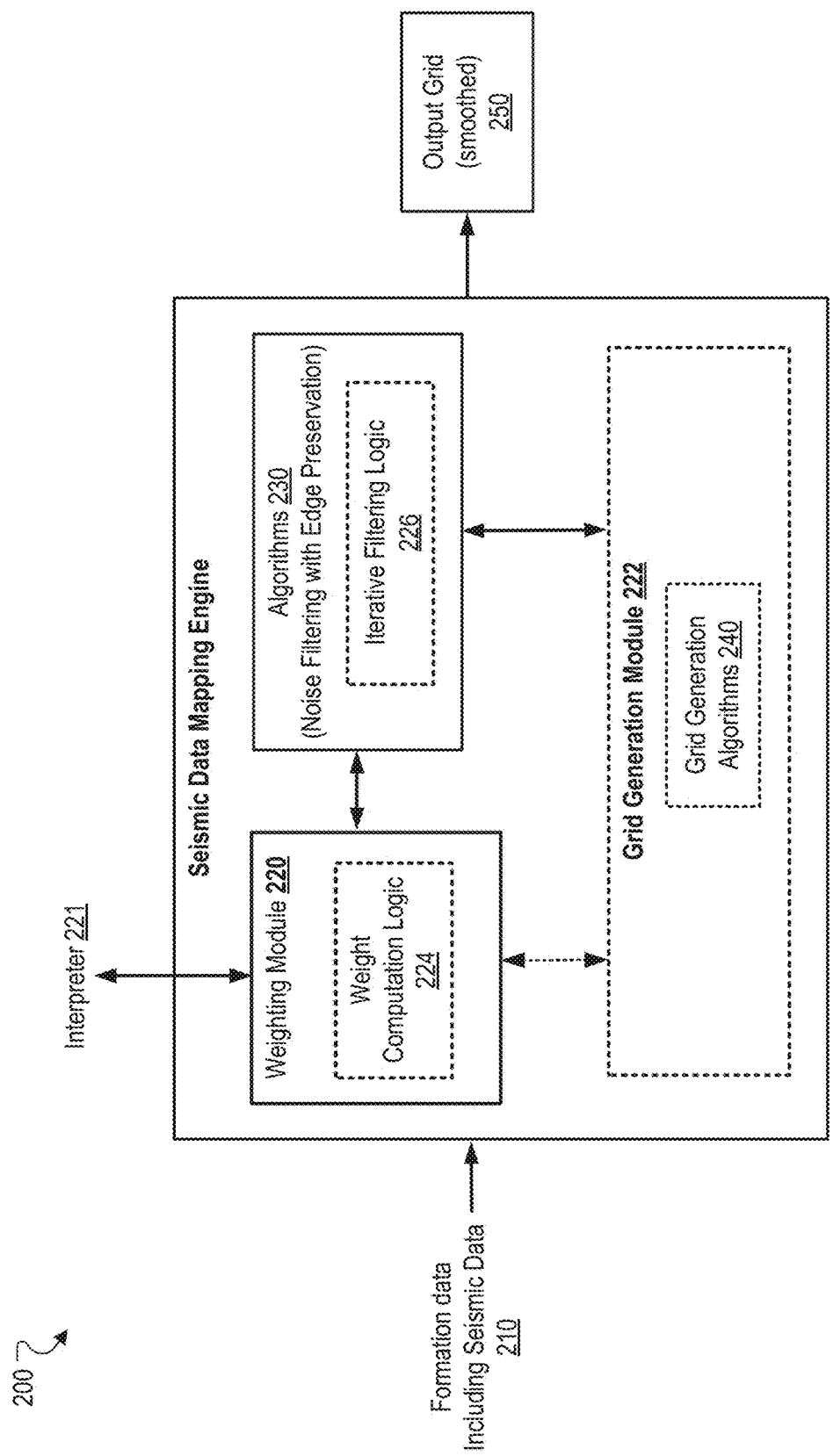
FIG. 2 illustrates an example computing system used to implement edge-preserving Gaussian grid smoothing of noise components in subsurface grids to generate geological maps of subsurface formations.

FIG. 2 illustrates an example computing device. In the example of FIG. 2, the computing device is a data mapping engine 200 ("mapping engine 200") used to implement edge-preserving Gaussian grid smoothing of noise components in subsurface grids.

The mapping engine 200 is configured to generate geological maps of subsurface formations in response to smoothing or filtering out the noise components, while concurrently preserving the edges associated with discontinuities in the subsurface formations being mapped. The mapping engine 200 may be included in the computer system 124 described earlier with reference to FIG. 1. For example, the mapping engine 200 can be included in the computer system 124 as a sub-system of hardware circuits, such as a special-purpose circuit, that includes one or more processor microchips. Although a single mapping engine 200 is shown in the example of FIG. 2, in some cases the computer systems 124 can include multiple data mapping engines 200. Each of the data mapping engines 200 can include processors, for example, a central processing unit (CPU) and a graphical processing unit (GPU), memory, and data storage devices.

Referring to FIG. 2, mapping engine 200 includes a weighting module 220, a grid generation module 222, and mapping instructions corresponding to one or more algorithms 230 for implementing edge preservation concurrent with removal or reduction of noise components. In general, the mapping engine 200 can embody or represent mapping software used to process an input grid. The input grid can be an example subsurface grid that is derived, or otherwise generated from, a set of data (e.g., seismic data or kriging or AI-based estimates for subsurface reservoir properties) which includes information about properties of a subsurface formation.

As mentioned earlier, subsurface grids include noise components and discontinuities such as edges, faults, or facies. The weighting module 220 is configured to interpret seismic attributes that indicate discontinuities and provide them as inputs to a gridding algorithm in the grid generation module 222. Example gridding algorithms available in mapping software associated with the mapping engine 200 are represented by grid generation algorithms 240. In some implementations, the gridding algorithms 230 are computational procedures for determining the values to be assigned to grid elements on a map. For example, the algorithms 230 can be deterministic gridding algorithms that are based on methods of interpolation and stochastic approaches that include geostatistical methods such as kriging. Although the grid generation module is typically used to generate the initial subsurface grid (e.g., based on wellbore data and processed seismic data), the seismic data mapping engine can receive the initial grid as input in some cases.

The weighting module 220 is included in the mapping software to implement preservation of certain discontinuities when filtering noise from a subsurface grid. The grid generation module 222 communicates with the weighting module 220 to receive and provide data associated with a weighting grid. For example, the weighting grid is generated by the grid generation module 222 to correspond with the initial grid being processed. Values of the grid-points of the weighting grid are generated by the weighting module 220 based on seismic attributes of the subsurface formation. Instead of ceding full control to the weighting module 220 for the determination of which discontinuities (e.g., edges, faults) the algorithm 230 is preserving, the improved approach for filtration of grid noise causes the weighting module 220 to obtain and pass the weighting grid as an input to the algorithm 230. The weighting module 220 provides input/output functionality that enables a human interpreter 221 to control the edges being preserved. The algorithm 230 use the weighting grid to preserve certain discontinuities when filtering noise components from the subsurface grid.

The grid-point weighing module 222 includes weight computation logic 224 that assigns weights to grid points based on selected seismic attributes. The seismic data mapping engine can generate seismic attributes (for example, in the weighting module 220) or can receive the seismic attributes as input. For example, a horizon slice can be extracted along subsurface formation to make a 2D edge-detection attribute grid. Such attribute grids can be used as input to edge-preserving grid filtering. In fact, multiple edge-detection attribute grids can be used later for edge-preserving filtering. Computing subsurface boundaries from seismic to generate the attribute grid(s) explicitly separates the edge detection from grid filtering. This allows an interpreter the option of modifying such attributes before they are used in grid filtering.

Figure 5:
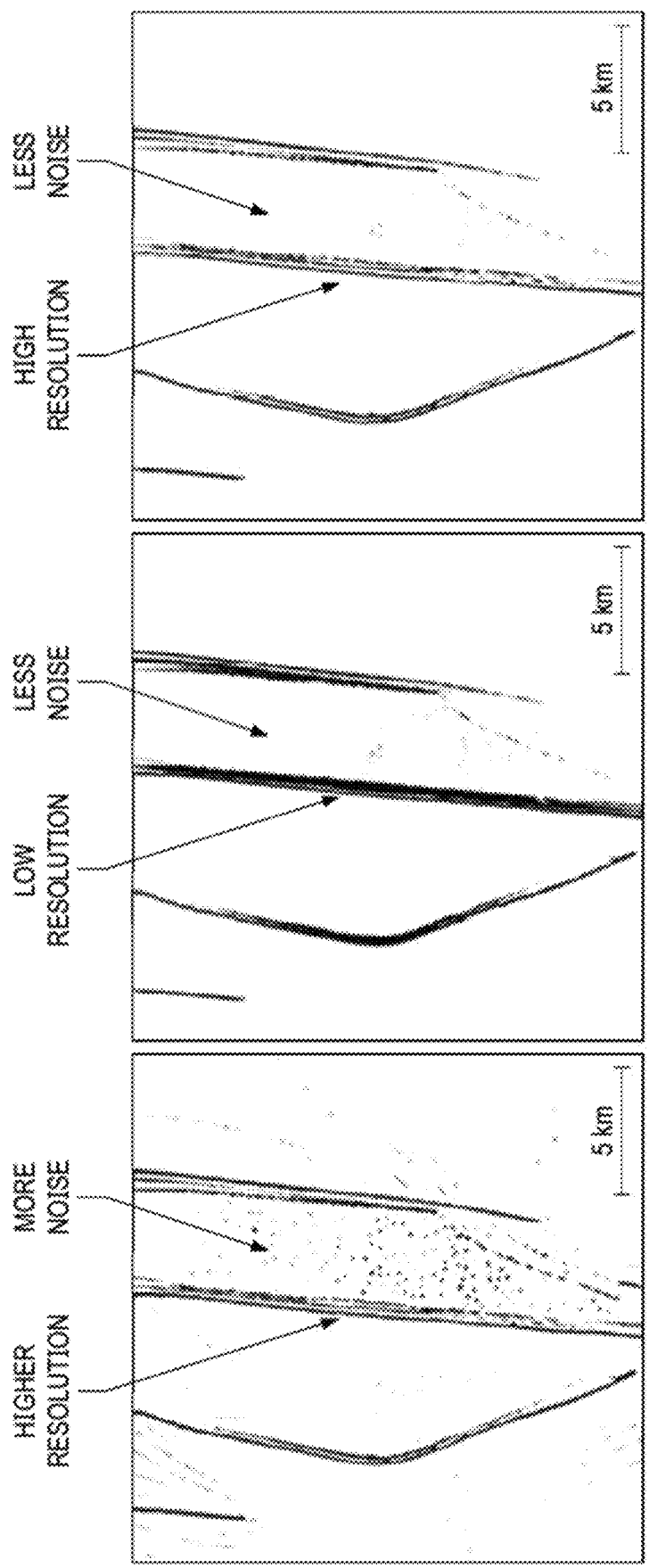
FIG. 5A and FIG. 5B show, respectively, example Similarity and Semblance edge-detection attributes.
FIG. 5C is an example illustration that shows multiplication of the similarity and the semblance edge-detection attributes.

Seismic attributes that can indicate geological discontinuities include similarity, semblance, coherence, and fault likelihood attributes. These attributes can be generated using known edge-detection algorithms and workflows for detecting subsurface boundaries from seismic data. Due to the merging of several seismic surveys, change in terrain across the area of 3D surveys, rapid topography changes, near-surface velocity variations, shallow absorption effects, multiple reflection interference, and many other causes, spurious boundaries may emerge in the 3D edge-detection cubes. Therefore, if an attribute grid is used as is, spurious boundaries would be preserved during the smoothing process. Some edge detection algorithms are more sensitive than others to different kinds of noises and different edge-detection can detect edges with different resolutions. The weighting module 220 allows multiple attributes to be selected and combined to generate the weighting grid. In some implementations, the choice of the attribute(s) is case dependent, and the interpreter may start with a single attribute and progressively add attributes, as needed, to detect geological boundaries and suppress spurious boundaries. An example of generating a weighting grid from similarity and semblance attributes is discussed with reference to FIG. 5.

The algorithms 230 include iterative filtering logic 226. In some implementations, the algorithms 230 uses the iterative filtering logic 226 to implement a compact Gaussian filter. The compact Gaussian filter uses the weighting grid generated by the weighting module 220 rather than the standard Gaussian weighting to smooth the initial noisy grid generated by the grid generation module. In general, Gaussian filtering is known for its simplicity and ease of implementation, where each grid point in an output grid is a weighted sum of the corresponding grid point of an input grid, in addition to the points around it. An output grid can correspond to an example weighting grid generated by the grid-point weighing module 222.

The standard weights for Gaussian filters are determined by a Gaussian function represented by equation (1), shown below.

$$G(\Delta x, \Delta y) = \frac{1}{2\pi\sigma^2} e^{-\frac{(\Delta x^2 + \Delta y^2)}{2\sigma^2}} \quad (1)$$

In equation (1), $\Delta x$ and $\Delta y$ is respectively the east-west and north-south spatial distance from the output grid point to the input points. The standard deviation $\sigma$ controls the width of the smoothing Gaussian function and, therefore, the higher the standard deviation, the smoother the output grid will be. The output grid is then computed using equation (2), shown below.

$$\text{output}[x_i, y_i] = \Sigma_j G(x_i - x_j, y_i - y_j) \cdot \text{input}[x_j, y_j] \quad (2)$$

Applying a wide-Gaussian smoothing filter to the grids will likely eliminate noise, but it would not preserve edges. It can be challenging to implement edge-preserving smoothing using wide Gaussian filters. The algorithms 230 use a technique of iterative local averaging to address this challenge. Iterative local averaging can be equivalent to Gaussian smoothing, according to the Central Limit Theorem, as generally known by one of ordinary skill in the art. In using the technique of iterative local averaging, the compact Gaussian filter is decomposed into four filters applied consecutively as follows.

$$\text{output}[x_i, y_i] = \frac{(\text{input}[x_j, y_j] + \text{input}[x_j + dx, y_j])}{2} \quad \text{Filter (1)}$$

$$\text{output}[x_i, y_i] = \frac{(\text{input}[x_j, y_j] + \text{input}[x_j - dx, y_j])}{2} \quad \text{Filter (2)}$$

$$\text{output}[x_i, y_i] = \frac{(\text{input}[x_j, y_j] + \text{input}[x_j, y_j + dy])}{2} \quad \text{Filter (3)}$$

$$\text{output}[x_i, y_i] = \frac{(\text{input}[x_j, y_j] + \text{input}[x_j, y_j - dy])}{2} \quad \text{Filter (4)}$$

The iterative filtering logic 226 includes computational instructions for accessing and using each of the preceding filters. The dx and dy as used in each of the four filters are the grid spacing in the east-west and the north-south directions, respectively. In some implementations, an output grid generated from any of the preceding filter equations is an input to a following filter equation. The mapping engine 200 is configured to iteratively process an example subsurface grid until a desired filtered grid is generated using the equations and filter equations discussed earlier. For example, a subsurface grid can be run through the averaging operations described earlier multiple times (or iteratively) until the desired filtered output is attained.

In the iterative averaging implementation, the algorithms 230 implement edge-preservation by introducing a spatially varying weight function $w[x_i, y_i]$, where the weights are decimal values in the range (0,1), to the equations above. Weights with decimal values that are near, or close to, "0"

("near-zero weights") can be assigned to the grid points overlapping with subsurface discontinuities, whereas weights with decimal values that are near, or close to, "1" ("near-one weights") can be assigned to grid points corresponding to areas without discontinuities. In some implementations, integer values may be also used as weight values. The weights for individual grid-points are determined by the weighting module 220 based on seismic attributes of the subsurface formation.

$$output[x_i, y_i] = \frac{(w[x_j, y_j] \cdot input[x_j, y_j] + w[x_j + dx, y_j] \cdot input[x_j + dx, y_j])}{(w[x_j, y_j] + w[x_j + dx, y_j])} \quad (3)$$

$$output[x_i, y_i] = \frac{(w[x_j, y_j] \cdot input[x_j, y_j] + w[x_j + dx, y_j] \cdot input[x_j - dx, y_j])}{(w[x_j, y_j] + w[x_j - dx, y_j])} \quad (4)$$

$$output[x_i, y_i] = \frac{(w[x_j, y_j] \cdot input[x_j, y_j] + w[x_j, y_j + dy] \cdot input[x_j, y_j + dy])}{(w[x_j, y_j] + w[x_j + dy, y_j])} \quad (5)$$

$$output[x_i, y_i] = \frac{(w[x_j, y_j] \cdot input[x_j, y_j] + w[x_j, y_j + dy] \cdot input[x_j, y_j - dy])}{(w[x_j, y_j] + w[x_j - dy, y_j])} \quad (6)$$

The iterative filtering logic 226 includes computational instructions for accessing and using each of the equations (3) through (6). In some implementations, the weight function is a grid provided by the weighting module 220 along with the noisy subsurface grid to a proposed mapping algorithm selected from among the algorithms 230. The mapping engine 200 is operable to derive a weighting grid by seismic attributes or any other sources of the seismic data input to the mapping engine 200. In some implementations, the weighting module 220 of the mapping engine 200 is configured to further edit the weighting grid based on determinations about what edges (for example, zeros in the weight grid) to preserve during application of a filtering process performed using the selected algorithm.

The interpreter can, for example, compute the weights by applying point-by-point arithmetic (e.g., addition, multiplication, thresholding) to the input edge-detection attribute grids. The output values of such point-by-point arithmetic will be continuous (i.e., floating-point numbers) and limited between zero and one. Such computations can be executed on input grids using existing mapping software packages, including both commercial and open source packages.

Figure 3:
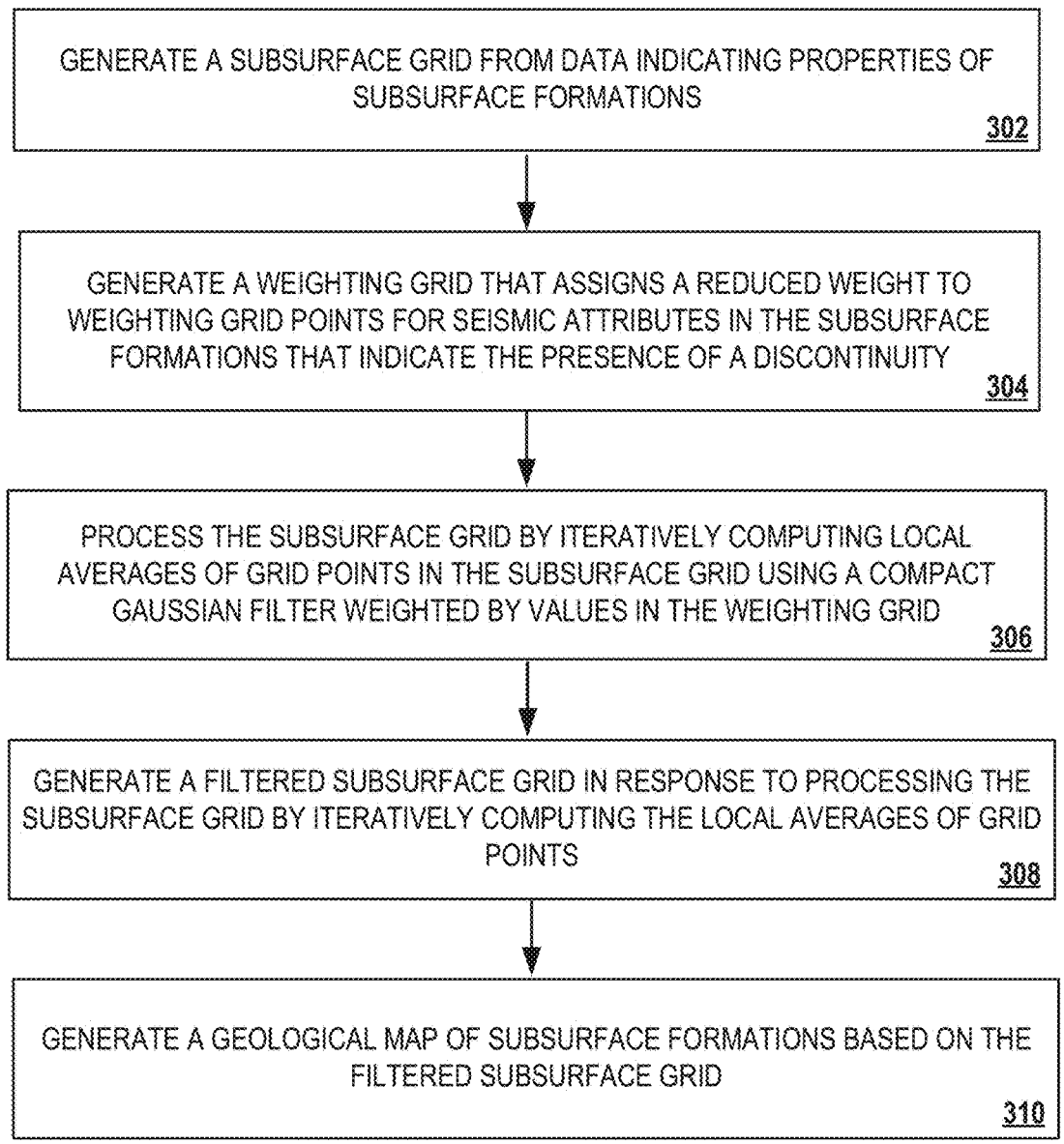
FIG. 3 shows an example process for generating geological maps of subsurface formations.

FIG. 3 shows an example process 300 for generating geological maps of subsurface formations. More specifically, process 300 is used to generate geological maps of subsurface formations by implementing edge-preservation and filtering of noise components in subsurface grids. Process 300 can be implemented or executed using the computer systems 124 and the mapping engine 200 so the descriptions of process 300 reference the computing resources of computer systems 124 and the mapping engine 200 described earlier in this document. In some implementations, the steps or actions included in process 300 are enabled by programmed firmware or software instructions, which are executable by one or more processors of the devices and resources described in this document.

Referring now to process 300, a subsurface grid is generated from data indicating properties of subsurface formations (302). A weighting grid is generated using a mapping engine of the system (304). For example, the mapping engine 200 generates a weighting grid that assigns a reduced weight to weighting grid points for seismic attributes in the subsurface formations that indicate the presence of a discontinuity. In some implementations, the weighting grid is generated by: i) receiving seismic data representing the subsurface formations and ii) generating seismic attributes associated with discontinuities in the subsurface formations.

For example, the mapping engine 200 receives the seismic data as an input used to derive parameters for seismic attributes associated with the discontinuities in the subsurface formations. The grid generation module 222 uses the seismic data to determine a weighting of weighting grid points for use with the iterative filtering logic 226. The weighting module 220 assigns a weight of 0 to weighting grid points for which seismic attributes associated with discontinuities in the subsurface formations to indicate the presence of a discontinuity. In some implementations, interactions between module 220 and module 222 are optional. The interactions can occur when both modules 220, 222 use the same horizon for attribute extraction and as input grid.

The subsurface grid is processed by iteratively computing local averages of grid points in the subsurface grid using a compact Gaussian filter weighted by values in the weighting grid (306). For example, the mapping engine 200 uses the weight computation logic 224 and the iterative filtering logic 226 of the grid generation module 222 to iteratively compute local averages of grid points in the subsurface grid based on the compact Gaussian filter. In some implementations, the iterative filtering logic 226 decomposes the compact Gaussian filter into multiple individual filters.

For example, the compact Gaussian filter can be decomposed into four individual filters. Each of the four individual filters are applied consecutively to grid points in the subsurface grid. In some cases, each of the four individual filters are applied consecutively to grid points of an output grid that corresponds to at least one of the four individual filters.

A filtered subsurface grid is generated in response to processing the subsurface grid by iteratively computing the local averages of grid points in the subsurface grid (308). The mapping engine 200 is configured to iteratively process the subsurface grid until a desired filtered grid is generated using the equations and filters discussed earlier. Iteratively computing local averages of the grid points can include computing each iteration of a local average using a spatially varying weight function. In some implementations, the subsurface grid can be run through the averaging operations described earlier multiple times (or iteratively) until a desired filtered output is attained.

The criteria for the desired outcome can vary depending on the objective of smoothing. For example, one criterion is to smooth the grid until the energy ratio of the short-scale features to long-scale features is below a certain threshold. This criteria, for a given point on the 2D grid, can be expressed mathematically by the following equations.

$$\epsilon < \frac{\sum_{i \in B} |F_i|}{\sum_{i \notin B} |F_i|} \quad (7)$$

$$B = \{i \in B \mid k_i < k_{\max}\} \quad (8)$$

In the preceding equations, $|F_i|$ is the magnitude of i-th component of a discreet 2D Fourier transform of a detrended, tapered, and localized 4 km by 4 km window of the output grid, $k_i$ is the absolute wavenumber, $k_{max}$ is the maximum acceptable wavenumber, and $\epsilon$ is energy ratio threshold. This criterion can be applied for the points away from subsurface boundaries. A person of ordinary skill in the art would be able to deduce multiple variations to this criterion. The criterion can also be accomplished visually where the weighting module 220 can plot grid contours and determine that undulations of the contours are not smaller than a certain distance, such as 1 km. A geological map of the subsurface formations is generated based on the filtered subsurface grid (310).

Figure 4:
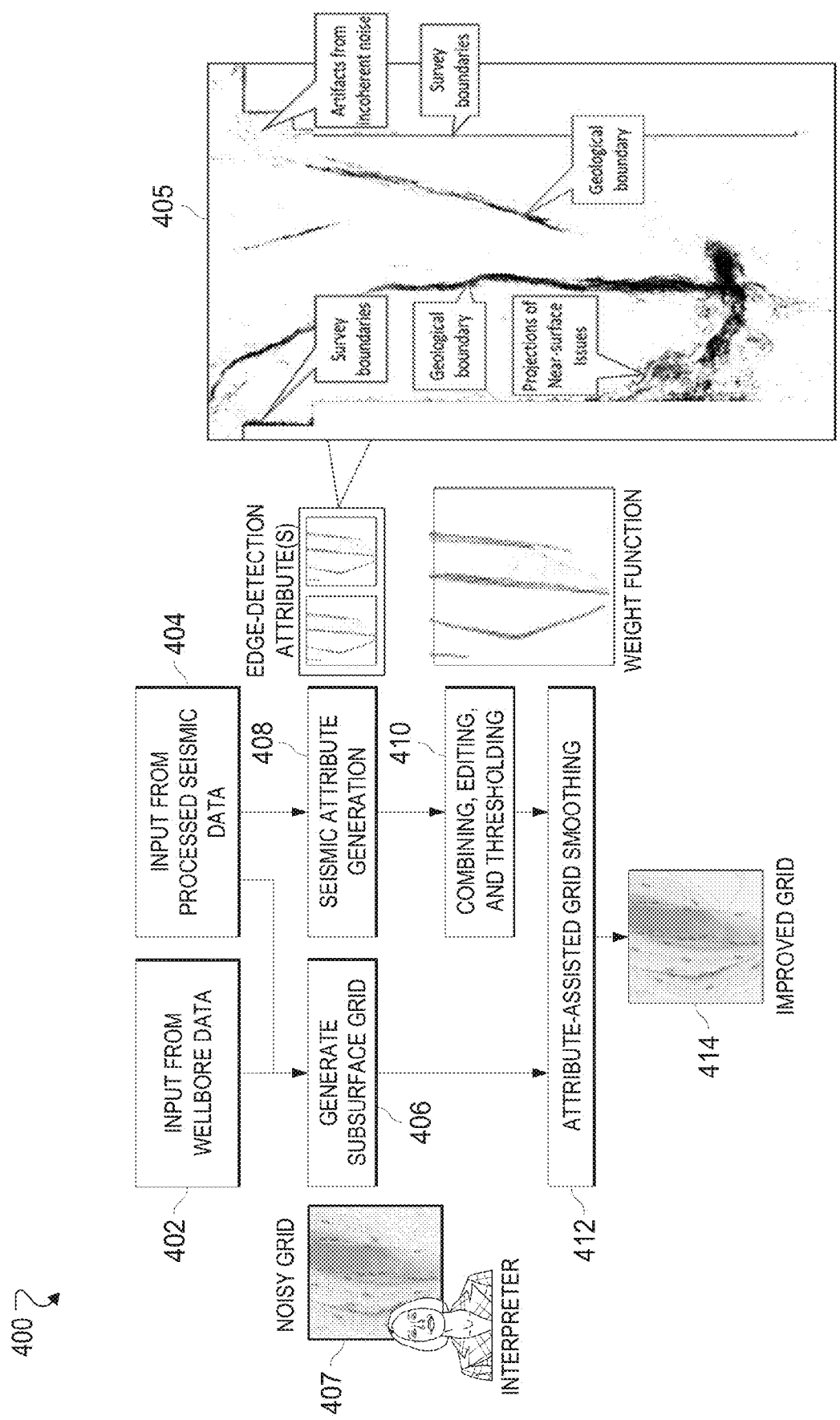
FIG. 4 illustrates an example flow diagram for implementing edge-preserving Gaussian grid smoothing of noise components in subsurface grids.

FIG. 4 illustrates an example flow diagram 400 for implementing edge-preserving Gaussian grid smoothing of noise components in subsurface grids. In some implementations, the flow diagram 400 represents an example workflow that the weighting module 220 may follow to apply edge-preserving filtering.

As an example, the workflow was performed on a synthetic data set generated using a modified version a Society of Exploration Geophysicists/European Association of Geoscientists & Engineers (SEG/EAGE) Overthrust Model. With regard to the model, a 1D wave-equation modeling is performed to emulate primary and multiple seismic reflections. The model uses a band-limited wavelet and back-scattered and random noises can be added to the input data to mimic field data. During modeling, a seismic volume can be imported to example software used to implement the model and interpreted by auto-tracking a basement reflector at a bottom of the model. The auto-tracked horizon was then used as the input grid to the proposed method. The example grid was composed of 801 by 801 grid cells with 25 meters spacing. Similarity and semblance attributes were computed from the generated seismic volume and the attributes were sliced along the selected basement horizon.

The steps or operations of diagram 400 relate generally to the field of geophysical and geologic prospecting, including the analysis of seismic data based on the techniques described in this document for improved filtering of noise, while preserving discontinuities. Operational steps of diagram 400 can be implemented to expedite obtaining an accurate interpretation of faults and edges in a seismic data for a subsurface formation. In some cases, the operations correspond to a data mapping technique implemented to save or reduce the time spent on interpreting faults and to realize improvements in the accuracy of the geological maps. For example, improvements can be realized from the utilization of seismic attributes computed using the weighting module 220 and the grid-point weighing module 222 described earlier.

The operations of diagram 400 are described with reference to the mapping engine 200 described earlier with reference to FIG. 2. The mapping engine 200 receive inputs from wellbore data (402) and inputs from processed seismic data (404). The mapping engine 200 generates a subsurface grid from data indicating properties of subsurface formations (406). For example, a sample noisy grid 407 was generated from data indicating properties of the subsurface formations, where the data corresponds to the input from the wellbore data and the input from the processed seismic data.

Determining the validity of subsurface boundaries can be a subjective process that depends on experience and the knowledge of local geology. Invalid boundaries can have different characteristics than the geological boundaries. For example, the noisy grid 405 shows an example of an edge-detection attribute (described below), known as a coherence attribute that contains non-geological boundaries that the weighting module 220 might not wish to preserve during the filtering process.

The mapping engine 200 generates seismic attributes (408). The seismic attributes can be generated in response to the grid-point weighing module 222 receiving, from the weighting module 220, the input(s) from processed seismic data that represent aspects of subsurface formations. In some implementations, the weighting module 220 can edit an attribute to eliminate one or more false edges, for example, based on direction from the interpreter 221.

The mapping engine 200 implements a combining, editing, and thresholding technique based on the seismic attributes (410). This technique is implemented with reference to an weight function obtained using the equations (3)-(6) and filters (1)-(4) described earlier. For example, the weight function can be obtained by combining several edge-detection attributes generated from the inputs processed from the seismic data. The mapping engine 200 performs a combining of such attributes based on a mathematical formula selected by the weighting module 220. For example, the weighting module 220 can determine that a particular mathematical formula best represents the geological discontinuities of a noisy subsurface grid.

The mapping engine 200 implements attribute-assisted grid smoothing (412). For example, the mapping engine 200 implements this smoothing technique when the subsurface grid is processed by iteratively computing local averages of grid points in the subsurface grid using a compact Gaussian filter weighted by values in the weighting grid. In the flow diagram 400, an improved grid 414 corresponding to a filtered subsurface grid is generated. For example, the improved grid 414 is generated as an output of the mapping engine 200 in response to iteratively computing the local averages of grid points in the subsurface grid.

The approaches discussed earlier with respect to the combining, editing, and thresholding technique can be applied to the input edge-detection attribute grid(s) (for example, noisy edge-detection attribute grid 405) and the weight functions discussed earlier to generate the improved grid illustrated at FIG. 4. Using the weight function and other aspects of the example workflow, improved grids can be obtained in which undesired noises are reduced through smoothing while maintaining the boundaries detected through the edge-detection attributes.

In some cases, the suppressed noise based on attribute-assisted smoothing can be shown as contours with fewer undulations. For example, standard smoothing without incorporation of the attribute-assisted smoothing described in this document has the undesired side effect of smoothing steep edges and other discontinuities. Contours across a fault are gentler in a smoothed grid generated using standard smoothing. However, the improved attribute-assisted smoothing approaches described in this document preserves most (or all) of the steepness across the fault, while concurrently removing noise from the faults.

FIGS. 5A and 5B show, respectively, example similarity and semblance edge-detection attributes, where the black features (e.g., near zero values) are detected faults. The attributes can be generated using OpendTect software based on the synthetic data discussed with respect to FIG. 4. These figures show horizon slices from edge-detection attributes, where the black features are detected boundaries. FIG. 5A is a slice from the similarity cube. FIG. 5B is a slice from the semblance cube. For the dataset used, the similarity attribute shows higher resolution boundaries than the semblance attribute, which might not be the case for other datasets. In particular, the similarity attribute shows non-linear noise features that do not have the characteristics of geological boundaries. This noise is greatly reduced in the semblance attribute.

FIG. 5C is an example illustration that shows multiplication of the similarity and the semblance edge-detection attributes, as determined by the interpreter to obtain the best of the two attributes (i.e., high resolution edges and low noise level). In the example of FIG. 5C, the multiplication of the similarity slice and the semblance slice provides a combined attribute that was anticipated to capture the best characteristics of the two attributes corresponding to high resolution edge attributes and low noise level attributes. Combining multiple edge-detection attributes, with possible hand-editing by the interpreter 221, provides interpreters full control of the edges to be preserved.

In the example discussed with respect to FIG. 4, the mapping engine 200 used a combination of the similarity and semblance attributes to generate a weight function. The similarity and semblance attributes were combined using the following approach.

For example, a first attribute grid is scaled to have values within a range from zero and one, using the following equation/formula.

$$\hat{a}(x, y) = \max\left[\varepsilon, \min\left[\left(\frac{a(x, y) - \min_{(x,y)} a(x, y)}{\max_{(x,y)} a(x, y) - \min_{(x,y)} a(x, y)}\right), 1\right]\right] \quad (9)$$

In the above formula (9), a(x,y) is the edge-detection attribute 2D grid polarity corrected such that detected boundaries have small values and areas without boundaries have larger values $$\min_{(x,y)} a(x, y)$$

is the minimum threshold value below which fault/boundary existence is definite, and $$\max_{(x,y)} a(x, y)$$

is the maximum threshold value above which the fault/boundary absence is definite. The minimum and maximum threshold values are first set respectively to be the $10^{th}$ and the $90^{th}$ percentile values from the distribution of values in the edge-detection attribute grid. The threshold values are then refined by iteratively modifying those values and visually inspecting the result of formula (9) by the interpreter. The parameter E is a small value that is set to 1% in some implementations; the objective of this parameter is to ensure that there is no division by zero of weights during the iterative smoothing.

After scaling and thresholding similarity and semblance parameters, the grid-point weighing module 222 is configured to combine the parameters into the weight function using the following equation/formula.

$$w(x,y) = 1 - (1 - \hat{a}_{Semblance}(x,y)) * (1 - \hat{a}_{Similarity}(x,y)) \quad (10)$$

In some implementations, the formula is chosen to incorporate higher resolutions of the similarity attribute over the semblance attribute. The formula (9) can also reduce noises that similarity has by multiplying by the cleaner semblance attribute. A person of ordinary skill in the art would be able to select different formulas for combining several edge-detection attributes. Applying such arithmetic computations on the grids can be done using existing subsurface mapping software. In some cases, edge-detection attributes can be filtered before scaling and thresholding. The weighting module 220 can be allowed to be in full control of what constitutes an edge. This control mode can be assigned to the weighting module 220 based on the determinations made by the computer systems 124, user input, or both. For example, the weighting module 220 can have full freedom to manipulate attributes and the manner in which attributes are combined to generate a weighting grid.

The grid-point weighing module 222 can assign a weight of 0 to weighting grid points that the seismic attributes associated with discontinuities in the subsurface formations indicate the presence of a discontinuity. The grid-point weighing module 222 is configured to generate a weighting grid that has the same geometry as an example input grid 210, such as the subsurface grid of step 406. In some implementations, the grid-point weighing module 222 computes weights based on a thresholding technique to ensure that each weight has a positive value. The thresholding technique causes the weights to be within the range [0, 1].

The numerical values for determining an assigned weight value of a weighting grid point can be based on a decimal threshold such as 0.12, so that values below 0.12 are forced to 0 to indicate the presence of discontinuities. The numerical values can be computed using the equations (1)-(6) and filters (1)-(4) described earlier. In some examples numerical weight values that are closer to zero are considered edges, whereas numerical weight values that are closer to one are considered areas that do not contain an edge feature.

Figure 6:
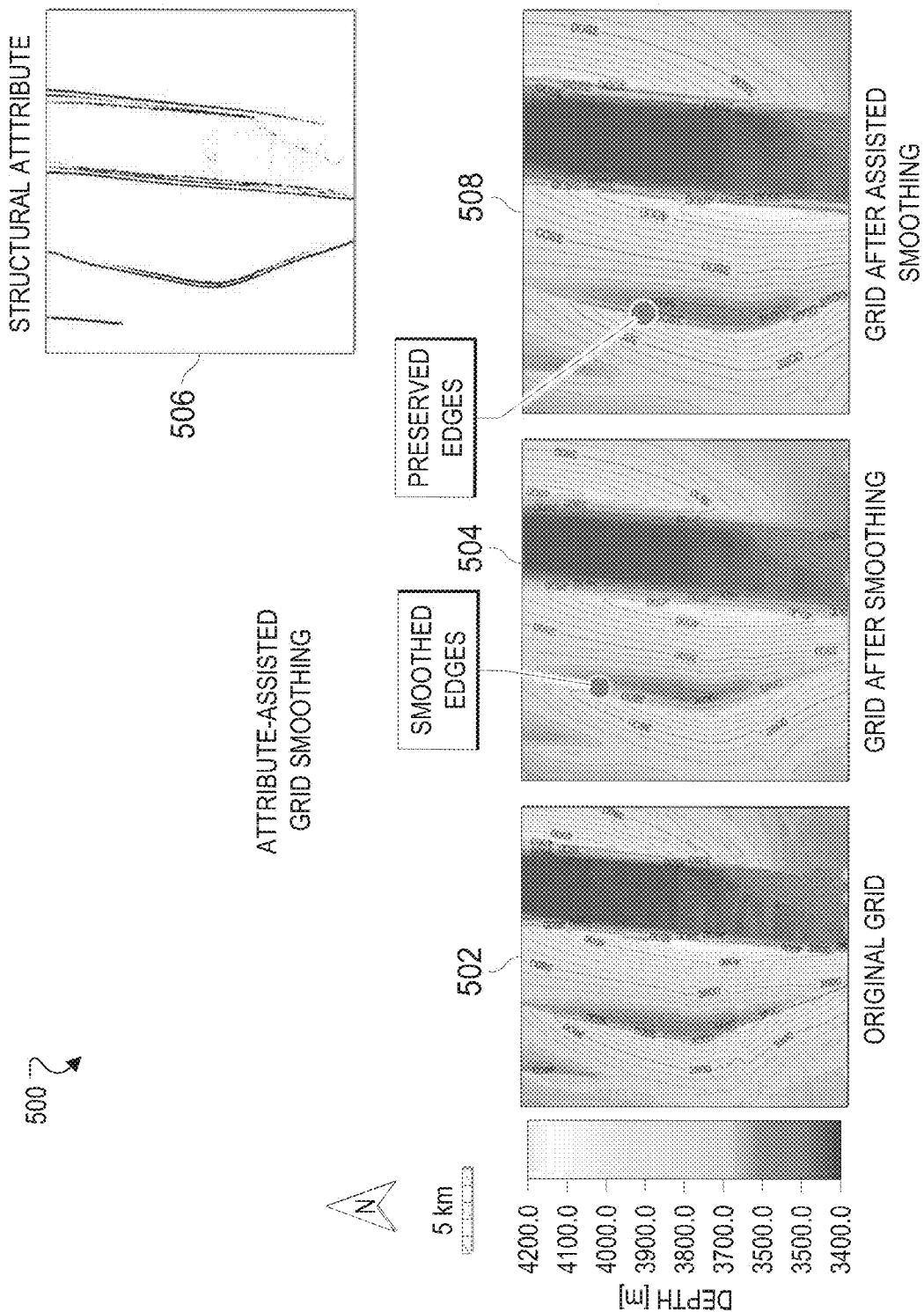
FIG. 6 illustrates examples of different subsurface grids.

FIG. 6 illustrates examples of different subsurface grids. A first grid 502 represents an example original noisy grid, whereas a second grid 504 represents an example smoothed grid, without edge preservation. The grid 504 represents a grid generated based on prior approaches that cause desired gridding effects such as smoothing out discontinuities along with filtering out the noise components. Such approaches can correspond to the example described earlier with reference to use of wide Gaussian filters. For example, applying a wide-Gaussian smoothing filter to a noisy grid will likely eliminate noise, but it would not preserve edges. Hence, it can be challenging to implement edge-preserving smoothing using wide Gaussian filters.

This improvements over the prior approaches addresses this challenge based on techniques that filter a subsurface grid to reduce or eliminate the noise effect, while preserving discontinuities such as edges or faults that are indicators of oil and gas resources for hydrocarbon exploration. For example, the techniques include generating a grid 506 that includes seismic/structural attributes that are associated with detected discontinuities in the subsurface formations based on the seismic data for generating the original noisy grid 502.

The grid 506, and its structural attributes 506, can represent an example weight function grid that is calculated by combining multiple edge-detection attributes using the approaches described earlier with reference to FIG. 4. The grid-point weighing module 222 assigns a weight of 0 to weighting grid points that the seismic attributes associated with discontinuities in the subsurface formations indicate the presence of an edge or fault.

These seismic attributes can be also described as edge-detection attributes that are provided by the weighting module 220 to a gridding algorithm 230 of the mapping engine 200. This feature of the weighting module 220 corresponds to attribute-assisted smoothing. The algorithm 230 uses these edge-detection attributes to implement edge-preservation concurrent with filtering of the noise components of the noisy grid 502. The mapping engine 200 generates an output grid 508 based on these techniques for attribute-assisted smoothing that filter a noisy subsurface grid 502 to reduce or eliminate noise, while preserving discontinuities such as edges or faults.

Figure 7C:
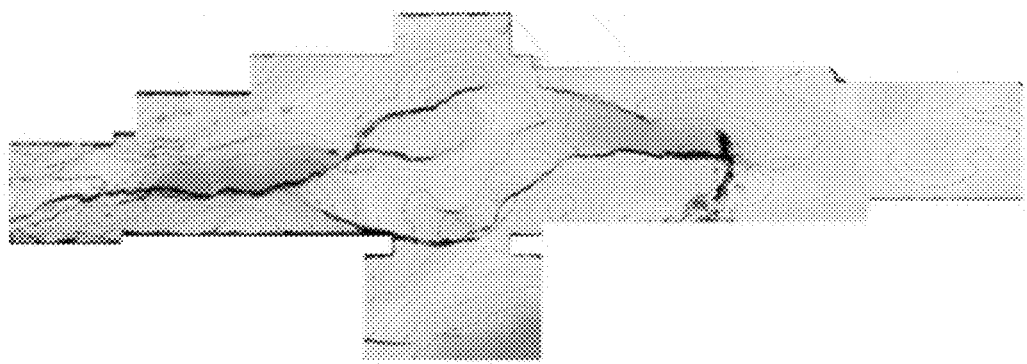
FIGS. 7A, 7B, and 7C are example illustrations indicating types of information conveyed by subsurface grids.
Figure 7B:
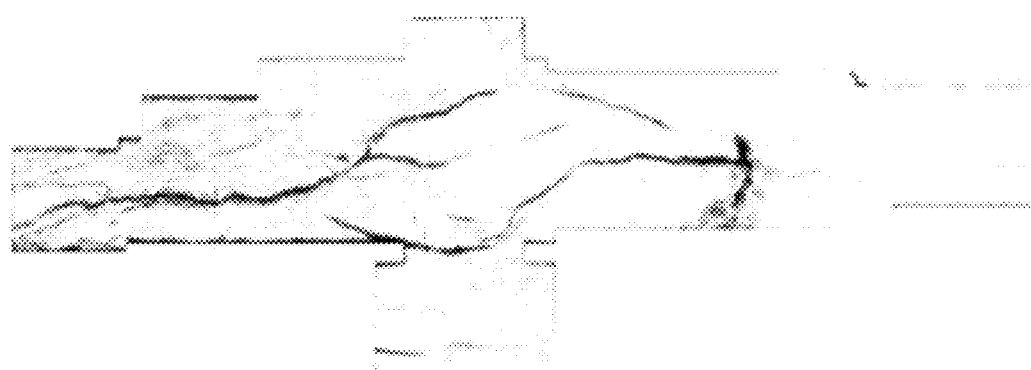
Figure 7A:
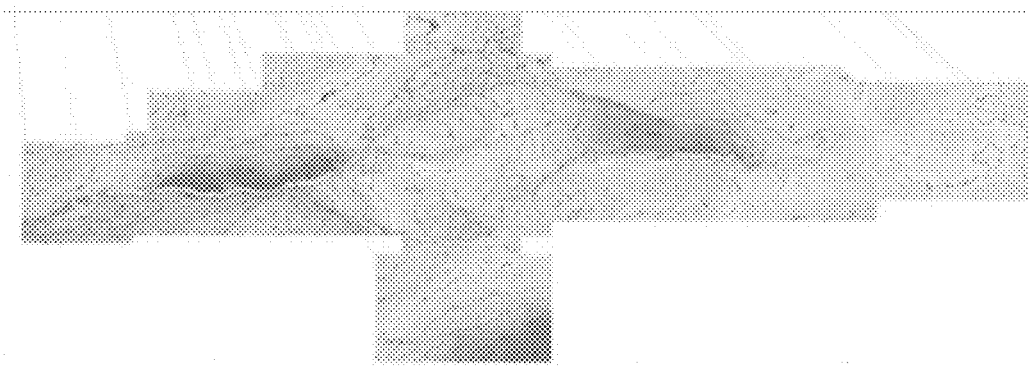

FIGS. 7A, 7B, and 7C are example illustrations indicating types of information conveyed by subsurface grids. FIG. 7A shows an example input noisy grid, which is similar to grid 502 described earlier. FIG. 7B shows an example of edge-detection attributes (for example, seismic attributes). FIG. 7C shows an example an output smoothed grid overlain by the edge-detection attributes of FIG. 7B for field data application. In the examples of FIGS. 7A and 7C, the color illustrations are representations of the coding or tools used to indicate subsurface features such as geological bodies or layers.

Figure 8:
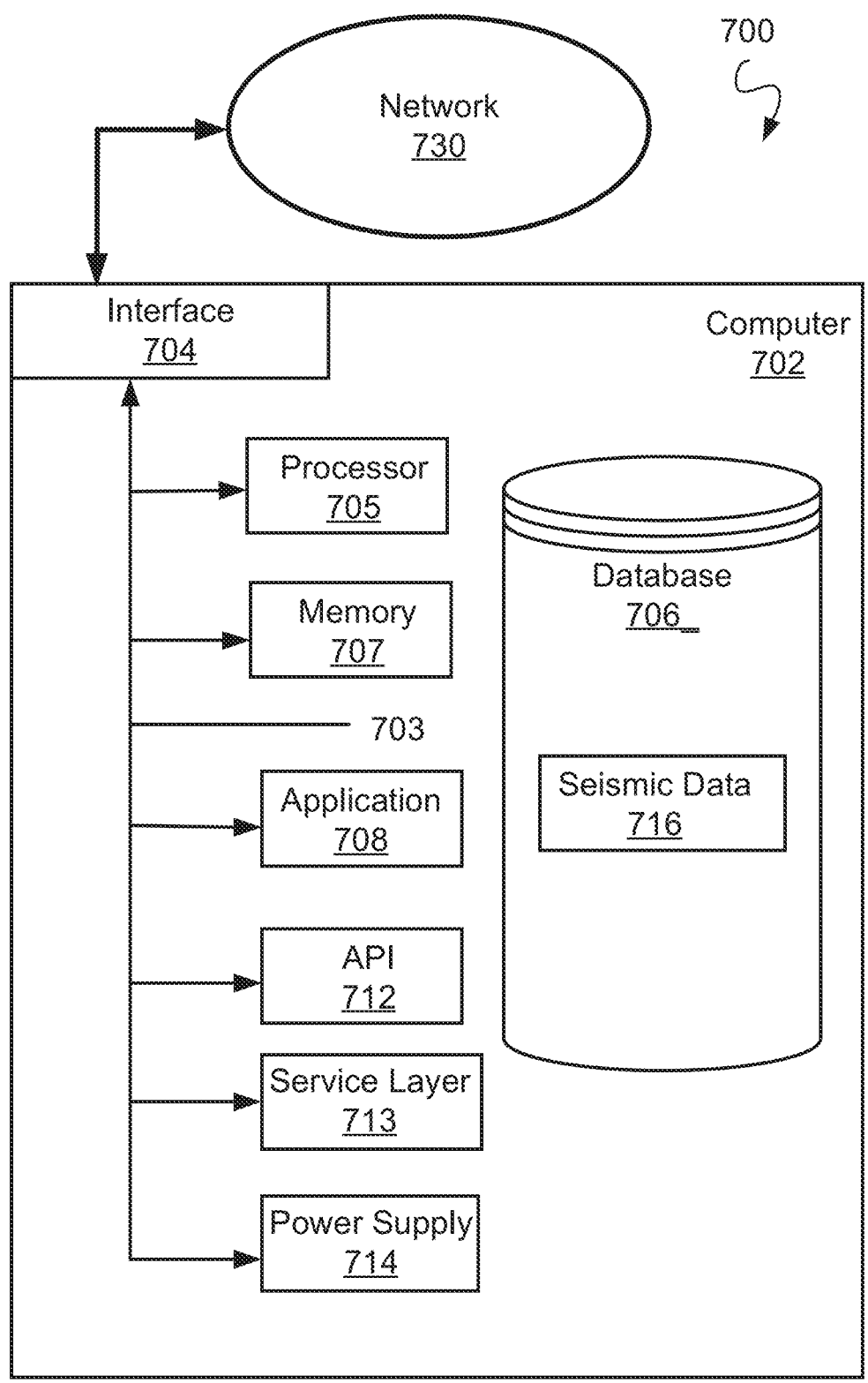
FIG. 8 is a block diagram illustrating an example computer system used to provide computational functionalities associated with described algorithms, methods, functions, processes, flows, and procedures according to some implementations of the present disclosure.

FIG. 8 is a block diagram of an example computer system 700 used to provide computational functionalities associated with described algorithms, methods, functions, processes, flows, and procedures described in the present disclosure, according to some implementations of the present disclosure.

The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

Generally, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data, including seismic data 716 (for example, seismic data described earlier at least with reference to FIG. 1), for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include multiple user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A method of generating geological maps of subsurface formations by implementing edge-preservation and filtering of noise components in subsurface grids, the method comprising:
    generating a subsurface grid from geophone sensor data indicating properties of the subsurface formations;
    generating, by a seismic mapping engine, a weighting grid that is distinct from the subsurface grid, where generating the weighting grid comprises:
        receiving seismic data representing the subsurface formations;
        identifying, from the seismic data, seismic attributes that are used to preserve geological discontinuities in the subsurface formations; and
        determining, by a weighting module of the seismic mapping engine, a reduced weight that is assigned to grid points of the weighting grid,
        wherein the grid points correspond to seismic attributes that indicate the presence of a discontinuity in the subsurface formations;
    accessing a compact Gaussian filter weighted by values in the weighting grid;
    iteratively computing, by the seismic mapping engine, local averages of grid points in the subsurface grid in response to processing the subsurface grid using the compact Gaussian filter that is weighted by values in the weighting grid;
    generating a filtered subsurface grid in response to iteratively computing the local averages of grid points in the subsurface grid, the filtered subsurface grid being distinct from the weighting grid; and
    generating a geological map of subsurface formations based on the filtered subsurface grid.

2. The method of claim 1, wherein iteratively computing local averages of grid points in the subsurface grid using the compact Gaussian filter comprises:
    decomposing the compact Gaussian filter into multiple individual filters; and
    applying each of the multiple individual filters consecutively to grid points in the subsurface grid that correspond to a discontinuity.

3. The method of claim 2, wherein iteratively computing local averages of grid points in the subsurface grid comprises:
    computing each iteration of a local average using a spatially varying weight function.

4. The method of claim 3, wherein generating the weighting grid comprises:
    varying the weight function based on spatial coordinates of a set of grid points in the subsurface grid; and
    generating the weighting grid in response to varying the weight function.

5. The method of claim 2, wherein applying each of the multiple individual filters consecutively to grid points in the subsurface grid comprises:
    generating a respective output grid for each application of an individual filter of the multiple individual filters.

6. The method of claim 5, further comprising:
    providing grid points of the respective output grid generated from a first application of a first individual filter as inputs to a second application of a second individual filter.

7. The method of claim 6, wherein generating the filtered subsurface grid comprises:
    generating the filtered subsurface grid based at least on a respective output grid that is generated from the second application of the second individual filter.

8. The method of claim 1, wherein generating a weighting grid comprises:
    generating a weighting grid that indicates each edge or discontinuity of the subsurface grid to be preserved when filtering a plurality of noise components in the subsurface grid.

9. The method of claim 1, wherein the compact Gaussian filter is decomposed into four individual filters that are applied consecutively to grid points in the subsurface grid or to grid points of an output grid that corresponds to at least one of the four individual filters.

10. A system for generating geological maps of subsurface formations by implementing edge-preservation and filtering of noise components in subsurface grids, the system comprising one or more processing devices and one or more non-transitory machine-readable storage devices storing instructions that are executable by the one or more processing devices to cause performance of operations comprising:

generating a subsurface grid from geophone sensor data indicating properties of the subsurface formations;

generating, by a seismic mapping engine, a weighting grid that is distinct from the subsurface grid, where generating the weighting grid comprises:

receiving seismic data representing the subsurface formations;

identifying, from the seismic data, seismic attributes that are used to preserve geological discontinuities in the subsurface formations; and determining, by a weighting module of the seismic mapping engine, a reduced weight that is assigned to grid points of the weighting grid, wherein the grid points correspond to seismic attributes that indicate the presence of a discontinuity in the subsurface formations;

accessing a compact Gaussian filter weighted by values in the weighting grid;

iteratively computing, by the seismic mapping engine, local averages of grid points in the subsurface grid in response to processing the subsurface grid using the compact Gaussian filter that is weighted by values in the weighting grid;

generating a filtered subsurface grid in response to iteratively computing the local averages of grid points in the subsurface grid, the filtered subsurface grid being distinct from the weighting grid; and generating a geological map of subsurface formations based on the filtered subsurface grid.

11. The system of claim 10, wherein iteratively computing local averages of grid points in the subsurface grid using the compact Gaussian filter comprises:

decomposing the compact Gaussian filter into multiple individual filters; and applying each of the multiple individual filters consecutively to grid points in the subsurface grid that correspond to a discontinuity.

12. The system of claim 11, wherein iteratively computing local averages of grid points in the subsurface grid comprises:

computing each iteration of a local average using a spatially varying weight function.

13. The system of claim 12, wherein generating the weighting grid comprises:

varying the weight function based on spatial coordinates of a set of grid points in the subsurface grid; and generating the weighting grid in response to varying the weight function.

14. The system of claim 11, wherein applying each of the multiple individual filters consecutively to grid points in the subsurface grid comprises:

generating a respective output grid for each application of an individual filter of the multiple individual filters.

15. The system of claim 14, wherein the operations further comprise:

providing grid points of the respective output grid generated from a first application of a first individual filter as inputs to a second application of a second individual filter.

16. The system of claim 15, wherein generating the filtered subsurface grid comprises:

generating the filtered subsurface grid based at least on a respective output grid that is generated from the second application of the second individual filter.

17. The system of claim 10, wherein generating a weighting grid comprises:

generating a weighting grid that indicates each edge or discontinuity of the subsurface grid to be preserved when filtering a plurality of noise components in the subsurface grid.

18. The system of claim 10, wherein the compact Gaussian filter is decomposed into four individual filters that are applied consecutively to grid points in the subsurface grid or to grid points of an output grid that corresponds to at least one of the four individual filters.

19. A non-transitory machine-readable storage device storing instructions for generating geological maps of subsurface formations by implementing edge-preservation and filtering of noise components in subsurface grids, the instructions being executable by a processing device to cause performance of operations comprising:

generating a subsurface grid from geophone sensor data indicating properties of the subsurface formations;

generating, by a seismic mapping engine, a weighting grid that is distinct from the subsurface grid, where generating the weighting grid comprises:

receiving seismic data representing the subsurface formations;

identifying, from the seismic data, seismic attributes that are used to preserve geological discontinuities in the subsurface formations; and determining, by a weighting module of the seismic mapping engine, a reduced weight that is assigned to grid points of the weighting grid, wherein the grid points correspond to seismic attributes that indicate the presence of a discontinuity in the subsurface formations;

accessing a compact Gaussian filter weighted by values in the weighting grid;

iteratively computing, by the seismic mapping engine, local averages of grid points in the subsurface grid in response to processing the subsurface grid using the compact Gaussian filter that is weighted by values in the weighting grid;

generating a filtered subsurface grid in response to iteratively computing the local averages of grid points in the subsurface grid, the filtered subsurface grid being distinct from the weighting grid; and generating a geological map of subsurface formations based on the filtered subsurface grid.

20. The machine-readable storage device of claim 19, wherein iteratively computing local averages of grid points in the subsurface grid using the compact Gaussian filter comprises:

decomposing the compact Gaussian filter into multiple individual filters; and applying each of the multiple individual filters consecutively to grid points in the subsurface grid that correspond to a discontinuity.

* * * * *